(12) United States Patent
Janson (10) Patent No.: US 9,694,663 B2
(45) Date of Patent: Jul. 4, 2017

(54) HYBRID TRANSMISSION

(71) Applicant: Ford Global Technologies, LLC, Dearborn, MI (US)

(72) Inventor: David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/808,253

(22) Filed: Jul. 24, 2015

(65) Prior Publication Data

US 2017/0021717 A1   Jan. 26, 2017

(51) Int. Cl.
*B60K 6/54* (2007.10)
*F16H 3/48* (2006.01)
*F16H 37/08* (2006.01)
*F16H 3/66* (2006.01)
*F16H 57/02* (2012.01)
*B60K 17/02* (2006.01)
(Continued)

(52) U.S. Cl.
CPC ............ *B60K 6/54* (2013.01); *B60K 17/02* (2013.01); *F16H 3/48* (2013.01); *F16H 3/66* (2013.01); *F16H 37/0813* (2013.01); *F16H 57/02* (2013.01); *B60K 6/365* (2013.01); *F16H 2003/442* (2013.01); *F16H 2057/02034* (2013.01); *F16H 2200/201* (2013.01); *F16H 2200/2007* (2013.01); *F16H 2200/2033* (2013.01); *F16H 2200/2097* (2013.01)

(58) Field of Classification Search
CPC .. B60K 6/54; B60K 6/365; F16H 3/66; F16H 2003/442; F16H 57/02; F16H 2057/02034; F16H 2200/2007; F16H 2200/2033; F16H 2200/2097; F16H 2200/201

USPC ............... 475/275–291, 5, 150; 74/606 R
See application file for complete search history.

(56) References Cited

U.S. PATENT DOCUMENTS

| 5,382,854 A | * | 1/1995 | Kawamoto | .......... B60K 7/0007 180/65.6 |
| 5,482,512 A | * | 1/1996 | Stevenson | .............. B60K 6/485 188/70 B |
| 5,558,595 A |   | 9/1996 | Schmidt et al. | |

(Continued)

FOREIGN PATENT DOCUMENTS

DE   102013013947 A1 *  2/2015  ............. B60K 6/365

OTHER PUBLICATIONS

2016 Chevrolet Volt Powertrain: How It Works in Electric, Hybrid Modes, http://www.greencarreports.com/news/1096942_2016_chevrolet_volt_powertrain_how-it-works, 6 pages.

*Primary Examiner* — Roger Pang
(74) *Attorney, Agent, or Firm* — David B. Kelley; Brooks Kushman P.C.

(57) ABSTRACT

A family of hybrid electric transmission arrangements share a common center housing, rear housing, two electric machines, power-split planetary gearset, and torque multiplication gearset. One arrangement additionally utilizes an overdrive gearset and an overdrive clutch. Another arrangement additionally utilizes two clutches and a brake to implement three operating modes. Since the components that differ between the two arrangements use the same general packaging space and all shift elements are hydraulically controlled via a front housing, the design of the front housing is also similar.

16 Claims, 5 Drawing Sheets (51) Int. Cl.
*B60K 6/365* (2007.10)
*F16H 3/44* (2006.01)

(56) References Cited

U.S. PATENT DOCUMENTS

| | | | |
|---|---|---|---|
| 6,371,878 B1 | 4/2002 | Bowen | |
| 6,958,027 B2 * | 10/2005 | Shimizu | B60K 6/365 180/65.235 |
| 7,081,060 B2 | 7/2006 | Hata et al. | |
| 7,621,835 B2 * | 11/2009 | Oshidari | B60K 7/0007 180/372 |
| 7,690,455 B2 | 4/2010 | Kano et al. | |
| 8,142,317 B2 | 3/2012 | Nagamatsu | |
| 8,287,425 B2 | 10/2012 | Omote et al. | |
| 8,556,758 B1 | 10/2013 | Schoenek et al. | |
| 8,622,870 B2 | 1/2014 | Kawasaki | |
| 2003/0069104 A1 * | 4/2003 | Nakano | B60K 6/38 475/5 |
| 2004/0110592 A1 * | 6/2004 | Yamauchi | B60K 6/365 475/5 |
| 2006/0111213 A1 * | 5/2006 | Bucknor | B60K 6/445 475/5 |
| 2007/0131464 A1 * | 6/2007 | Hwang | B60K 6/365 180/65.21 |
| 2008/0258569 A1 * | 10/2008 | Kano | B60K 6/445 310/51 |
| 2009/0111637 A1 * | 4/2009 | Day | B60K 6/445 475/159 |
| 2013/0040773 A1 * | 2/2013 | Sugino | B60K 6/365 475/5 |
| 2013/0324341 A1 | 12/2013 | Cho et al. | |
| 2016/0033015 A1 * | 2/2016 | Hwang | B60K 6/365 475/5 |
| 2016/0193908 A1 * | 7/2016 | Kanada | B60K 6/365 475/5 |
| 2016/0201769 A1 * | 7/2016 | Scholle | B60K 6/365 475/5 |

* cited by examiner

HYBRID TRANSMISSION

TECHNICAL FIELD

This disclosure relates to the field of hybrid transmissions for motor vehicles. More particularly, the disclosure pertains to the structure and support of components in a hybrid electric transmission.

BACKGROUND

Many vehicles are used over a wide range of vehicle speeds, including both forward and reverse movement. Most types of internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

In an effort to reduce fuel consumption, some transmissions are designed to utilize substantial amounts of energy storage in addition to liquid fuel burned in an internal combustion engine. Most commonly, the energy storage takes the form of electric batteries. The transmission diverts power to the batteries and utilizes power from the batteries using one or more reversible electric machines, such as synchronous motors or induction motors. A vehicle that uses traditional liquid fuel and also includes electrical storage is called a hybrid electric vehicle (HEV). When the vehicle includes provisions to charge the electric batteries from an external source, the vehicle is called a plug-in hybrid electric vehicle (PHEV).

One hybrid transmission configuration is a power-split hybrid. A power-split hybrid includes two electric machines. One of the electric machines is typically called the generator and the other is typically called the motor, although both are reversible electric machines. A planetary gearset distributes power from an internal combustion engine between the generator and the transmission output. The motor drives the transmission output. When the internal combustion engine is off, the motor can propel the vehicle using energy stored in the battery. During braking, the motor can converter vehicle kinetic energy to electrical energy for storage in the battery for later use. In some operating modes, the planetary gearset sends a portion of the power from the engine to the output via a mechanical power flow path and sends the remainder of the power to the generator which converts it to electrical power. The electrical power may be stored in the battery for later use, sent to the motor to supplement the power transferred via the mechanical power flow path, or some combination of the two. In other operating modes, typically associated with high vehicle speeds, the planetary gearset may draw power from the generator and send power from both the generator and the internal combustion engine to the output via the mechanical power flow path. The electrical energy to drive the generator in these modes may be drawn from the battery, from the motor, or from some combination of the two. Due to recirculation of power through the mechanical power flow path, the motor, and the generator, efficiency in these operating modes tends to be lower.

SUMMARY OF THE DISCLOSURE

A transmission includes an output, a first electric machine, and a first planetary gearset. The output is supported on a front side of a center housing while a stator of the first electric machine is fixed to the center housing and a rotor of the first electric machine is supported on a rear side of the center housing. A sun of the first planetary gearset is fixedly coupled to the rotor of the first electric machine, a carrier of the first planetary gearset is fixedly coupled to the output, and a ring of the first planetary gearset is fixedly held against rotation. The first planetary gearset may be located on the front side of the output. A rear housing may support rotor of a second electric machine. The rotors of the first and second machines may rotate about the same axis. A second planetary gearset may be located axially between the first and second rotors and radially inside the first and second stators. A sun of the second planetary gearset may be fixedly coupled to the rotor of the second electric machine. A carrier of second planetary gearset may be fixedly coupled to an input. A ring of the second planetary gearset may be fixedly coupled to an intermediate shaft. A front housing may support the input shaft and convey pressurized fluid to at least one hydraulically actuated clutch. One embodiment includes a third planetary gearset having a sun gear coupled to the front housing, a carrier coupled to the input, and a ring gear coupled to the output. Two of the planetary gearset elements may be fixedly coupled while the third is selectively coupled by the hydraulically actuated friction clutch. In a second embodiment, one friction clutch selectively couples the intermediate shaft to the output, another friction clutch selectively couples the intermediate shaft to the sun of the first planetary gearset, and a friction brake selectively holds the intermediate shaft against rotation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Two elements are fixed to one another if they are directly fastened together without intermediate parts. The elements may be fixed by spline connections, welding, press fitting, machining from a common solid, bolts, or other means. A group of elements are fixedly coupled to one another if they are constrained to rotate, or to not rotate, at the same speed about the same axis in all operating conditions. Elements may be fixedly coupled via intermediate parts. Slight variations in rotational displacement between fixedly coupled elements can occur such as displacement due to lash or shaft compliance. In contrast, two elements are selectively coupled by a clutch when the clutch constrains them to rotate, or not rotate, at the same speed about the same axis whenever the clutch is fully engaged and they are free to rotate at distinct speeds in at least some other operating condition. A clutch that holds an element against rotation by selectively coupling the element to a stationary housing may be called a brake. A group of elements are coupled if they are either fixedly coupled or selectively coupled.

Figure 1:
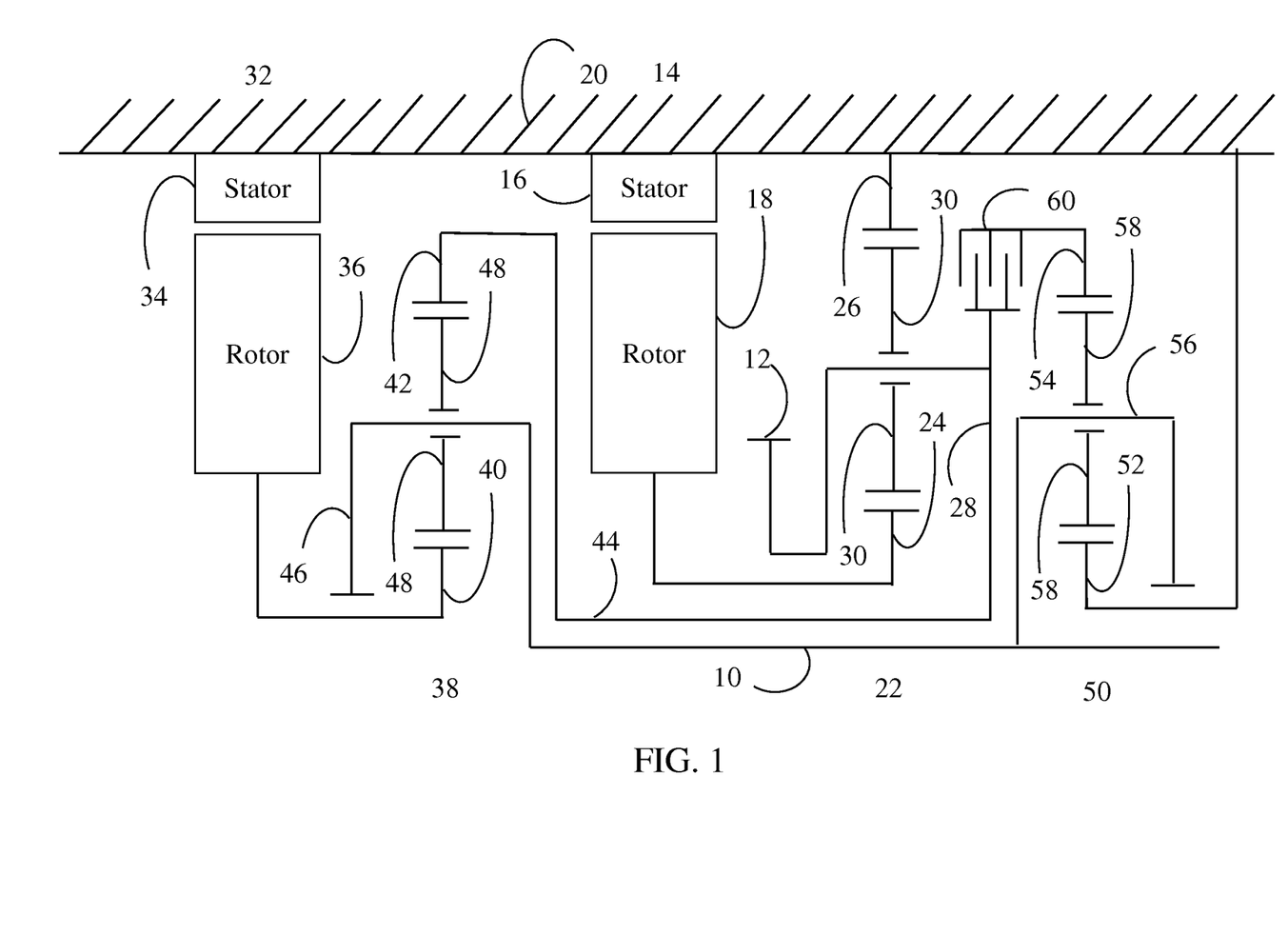
FIG. 1 is a schematic diagram of a first hybrid electric transmission arrangement.

A first power-split hybrid electric transmission is illustrated schematically in FIG. 1. Input 10 is driven by an internal combustion engine. Output 12 drives the vehicle wheels via a differential on an offset axis. Power may be transferred from output 12 to the differential by a chain and sprocket or by axis transfer gearing. Motor 14 includes a stator 16 fixedly and a rotor 18. Stator 16 is held against rotation by transmission case 20, which is mounted to vehicle structure. Gearset 22 includes a sun gear 24 fixedly coupled to rotor 18, a ring gear 26 fixedly held against rotation, a carrier 28 fixedly coupled to output 12, and a set of planet gears 30 supported for rotation with respect to carrier 28 and meshing with both sun gear 24 and ring gear 28. Generator 32 includes a stator 34 and a rotor 36. Simple planetary gearset 38 includes a sun gear 40 fixedly coupled to rotor 36, a ring gear 42 fixedly coupled to intermediate shaft 44, a carrier 46 fixedly coupled to input 10, and a set of planet gears 48 supported for rotation with respect to carrier 46 and meshing with both sun gear 40 and ring gear 42. Intermediate shaft 44 is fixedly coupled to output 12 via carrier 28.

Motor 14 drives output 12 via planetary gearset 22, which provides torque multiplication. When the internal combustion engine is off, motor 14 can propel the vehicle using energy stored in a battery. During braking, motor 14 can converter vehicle kinetic energy to electrical energy for storage in the battery. Planetary gearset 38 distributes power from input 10 between generator 32 and output 12. Planetary gearset 38 also establishes a speed relationship among rotor 36, input 10, and intermediate shaft 44. A controller can adjust the speed of rotor 36 by adjusting the electrical current to stator 34. By adjusting the speed of rotor 36, the controller can vary the speed ratio between input 10 and output 12 to any desired value between lower and upper limits. In some operating modes, in which rotor 36 rotates in the same direction as input 10, planetary gearset 38 sends a portion of the input power to output 12 and sends the remainder of the power to generator 32 which converts it to electrical power. The electrical power may be stored in the battery for later use, sent to motor 14 to propel the vehicle, or some combination of the two. In other operating modes, in which rotor 36 and input 10 rotate in the opposite directions, planetary gearset 38 may draw power from generator 32 and send power from both generator 32 and input 10 to the output 12. The electrical energy to drive generator 32 in these modes may be drawn from the battery, from motor 14, or from some combination of the two.

The hybrid electric transmission of FIG. 1 also provides a fixed overdrive operating mode. Simple planetary gearset 50 includes a sun gear 52 fixedly held against rotation, a ring gear 54, a carrier 56 fixedly coupled to input 10, and a set of planet gears 58 supported for rotation with respect to carrier 56 and meshing with both sun gear 52 and ring gear 54. Clutch 60 selectively couples ring gear 58 to output 12 via carrier 28. When clutch 60 is engaged, out 12 is constrained to rotate at a fixed multiple of the speed of input 10. Power may be transferred from input 10 to output 12 via gearset 50 and clutch 60 without use of either generator 32 or motor 14. This direct mechanical power transfer is more efficient than converting a portion of the power to electrical form in one electric machine and then back to mechanical form in the other electrical machine. Although the engine may be slightly less efficient because the engine speed is not optimized, there are many circumstances in which the overall efficiency is improved by use of the fixed ratio operating mode. While operating in this fixed ratio mode, generator 32 and/or motor 14 may be used to add power for improved performance or to divert some power to the battery for later use.

Figure 2:
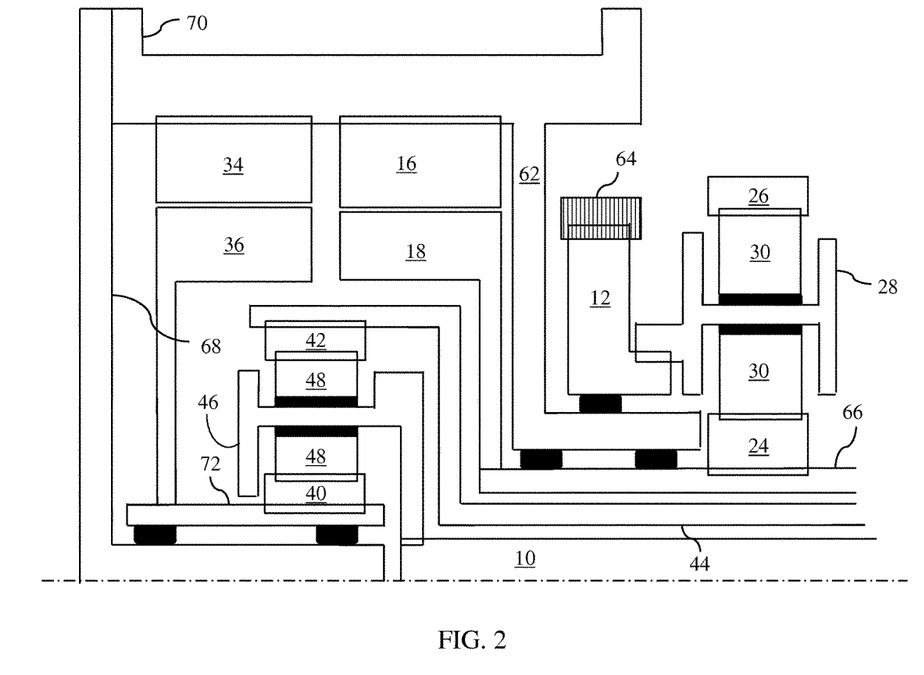
FIG. 2 is a cross sectional view of a rear portion of the hybrid electric transmission arrangement of FIG. 1.

FIG. 2 shows a cross section of a rear portion of a transmission according to the arrangement illustrated schematically in FIG. 1. Rear refers to the side opposite the end of the transmission through which the input shaft extends. Front refers to the side toward the end through which the input extends. A center housing 62 supports a number of the components. A housing is a single piece of the transmission structure. Typically, a housing is formed by casting or forging metal into a shape close to the final desired shape, but having some additional material in certain areas. Then, excess material is removed in critical areas using more precise types of machining in order to produce a finished housing having low part-to-part variation with respect to critical dimensions. A transmission case may include multiple housings fastened together with removable fasteners such as bolts. This makes the housings easier to produce and permits assembly of components into areas that would be inaccessible if the transmission case were manufactured in a single piece. Output 12 is supported for rotation by center housing 62 on a front side of center housing 62. Output 12 may be a sprocket meshing with chain 64 to transfer power to the differential assembly on another axis. Stator 16 is fixed to center housing 62 on a rear side of center housing 62. Motor shaft 66 is supported for rotation by center housing 62 and extends from the front side to the rear side of center housing 62. Rotor 18 is welded to rotor shaft 66 on the rear side of center housing 62 while sun gear 24 is splined to rotor shaft 66 on the front side of center housing 62.

Rear housing 68 is bolted to flange 70 of center housing 62. A leg of rear housing 68 supports generator shaft 72 for rotation. In some embodiments, the split line between center housing 62 and rear housing 68 may be shifted toward the front such that stator 34 is fixed to rear housing 68 instead of center housing 62 to reduce part-to-part variability of the air gap distance between stator 34 and rotor 36. Stator 34 is fixed to center support 62 and rotor 36 is welded to generator shaft 72. Sun gear 40 is splined to generator shaft 72, carrier 46 is splined to input shaft 10, and ring gear 42 is splined to intermediate shaft 44. Planetary gear set 38 is nested inside rotors 18 and 36 to reduce axial length.

Figure 3:
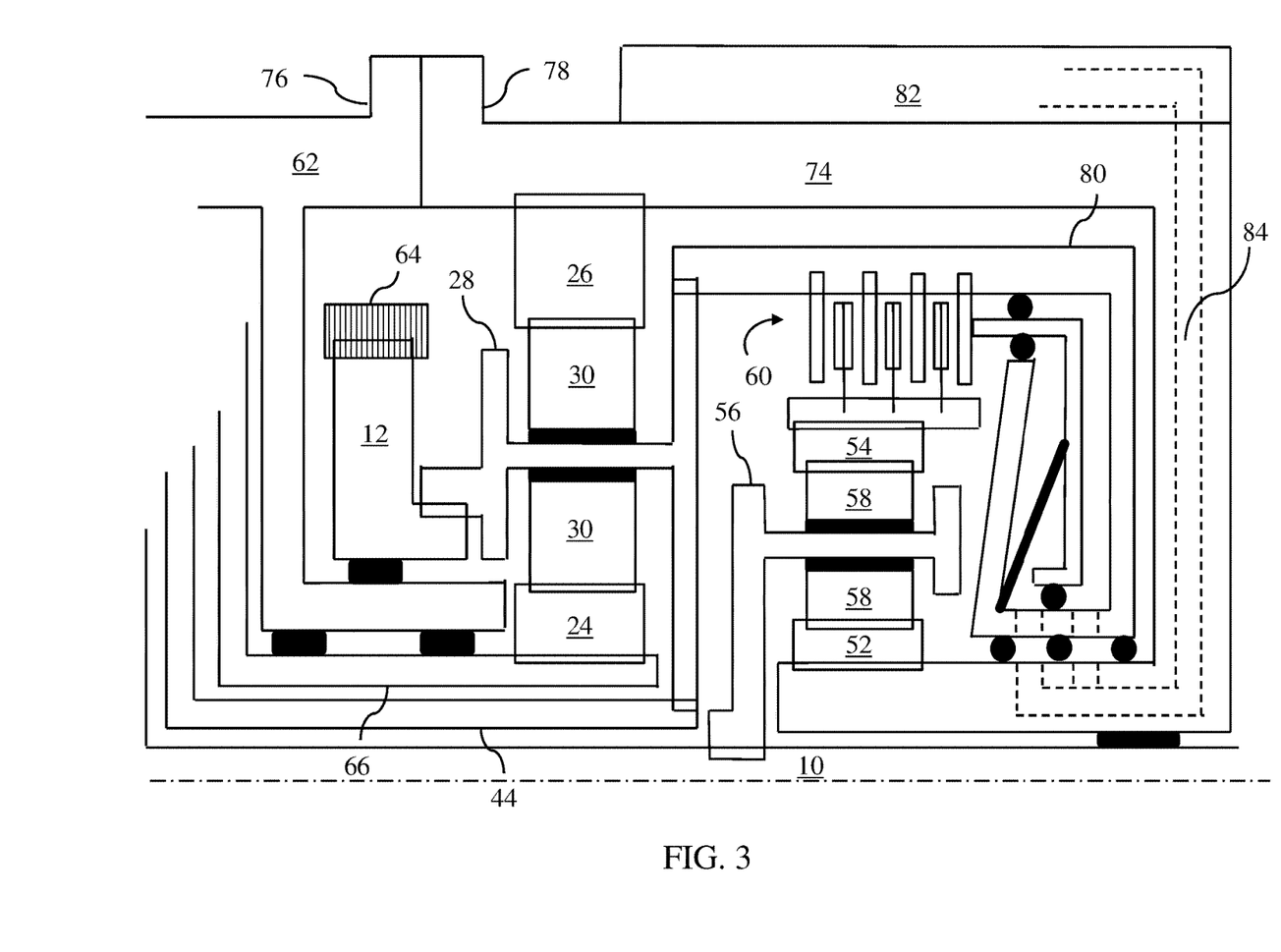
FIG. 3 is a cross sectional view of a front portion of the hybrid electric transmission arrangement of FIG. 1.

FIG. 3 shows a cross section of a front portion of a transmission according to the arrangement illustrated schematically in FIG. 1. Front housing 76 is bolted to center housing 62 through flange 76 of center housing 62 and flange 78 of front housing 72. Carrier 28 is splined to output 12, intermediate shaft 44, and clutch housing 80 of clutch 60. Sun gear 52 is splined to a leg of front housing 74. Carrier 56 is splined to input shaft 10. Ring gear 54 is splined to a hub of clutch 60. Front housing 74 is also fixed to valve body 82. Front housing 74 defines fluid passageways 84 that carry fluid from valve body 82 to clutch 60. One passageway carries fluid to an apply chamber. To engage clutch 60, the fluid is this passageway is pressurized forcing a piston to compress a clutch pack. A second passageway carries unpressurized fluid to a balance chamber.

Figure 4:
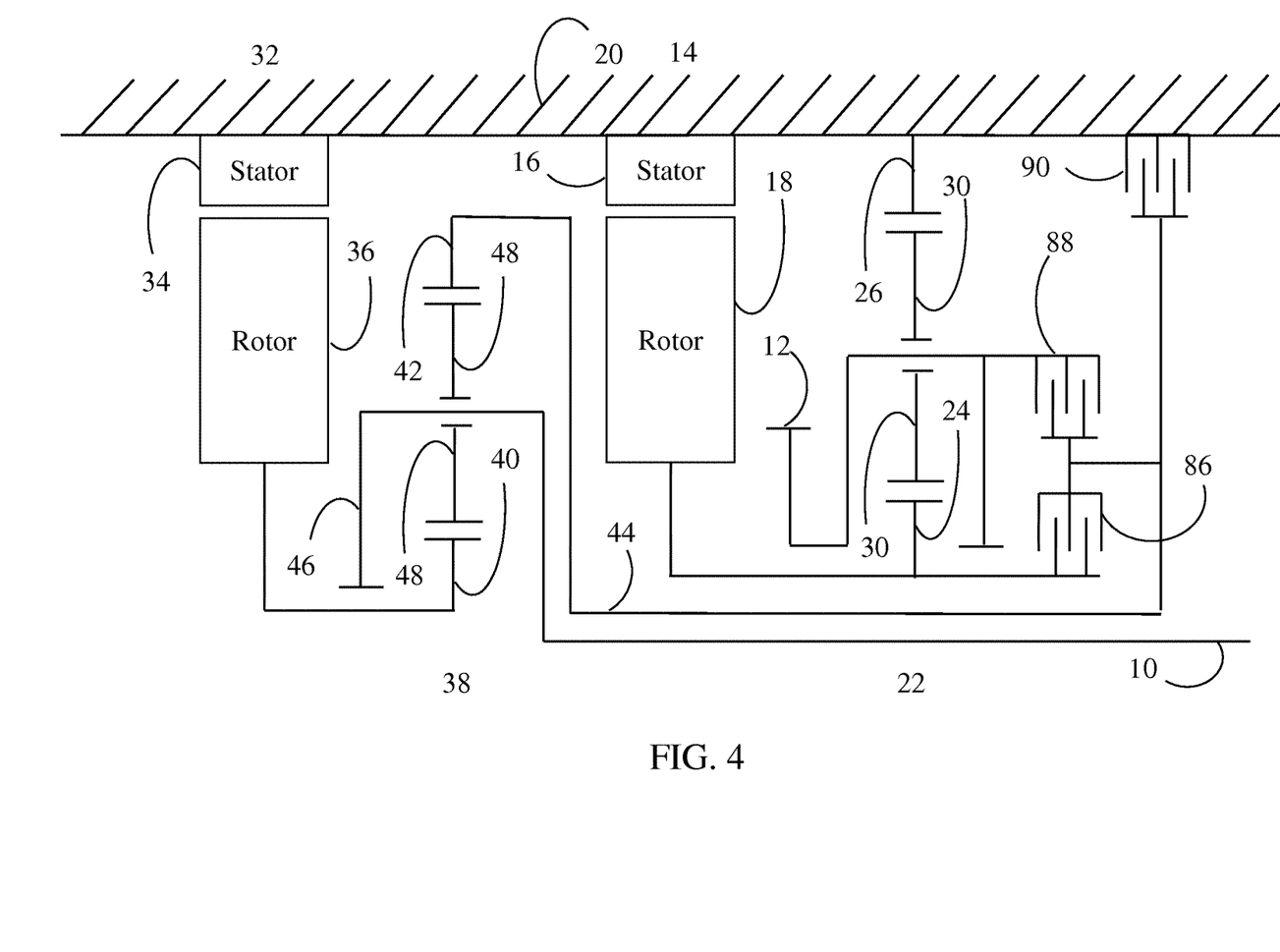
FIG. 4 is a schematic diagram of a second hybrid electric transmission arrangement.

A second power-split hybrid electric transmission is illustrated schematically in FIG. 4. Parts that are common with the transmission of FIG. 1 are labeled with the same reference number. Unlike the transmission of FIG. 1, intermediate shaft 44 is not fixedly coupled to output 12. Clutches 86 and 88 and brake 90 provide the modes of operation. Clutch 86 selectively couples intermediate shaft 44 to sun gear 24. Engaging clutch 86 selects a low mode. In low mode, the mechanical power flow path from power-split gearset 38 utilizes gearset 22 to provide torque multiplication. Clutch 88 selectively couples intermediate shaft 44 to output 12. Engaging clutch 88 selects a high mode, which functions the same as the transmission of FIG. 1 with clutch 60 disengaged. Brake 90 selectively holds intermediate shaft 44 against rotation. Engaging brake 90 selects a series mode. In series mode, there is no mechanical power flow path from power-split gearset 38 to the output. Rotor 36 is constrained to rotate at fixed multiple of the speed of input 10. Generator 32 converts all of the input power into electrical power. Motor 16 provides all of the power to propel the vehicle, using some combination of stored electrical power from the battery and electrical power from generator 32.

Figure 5:
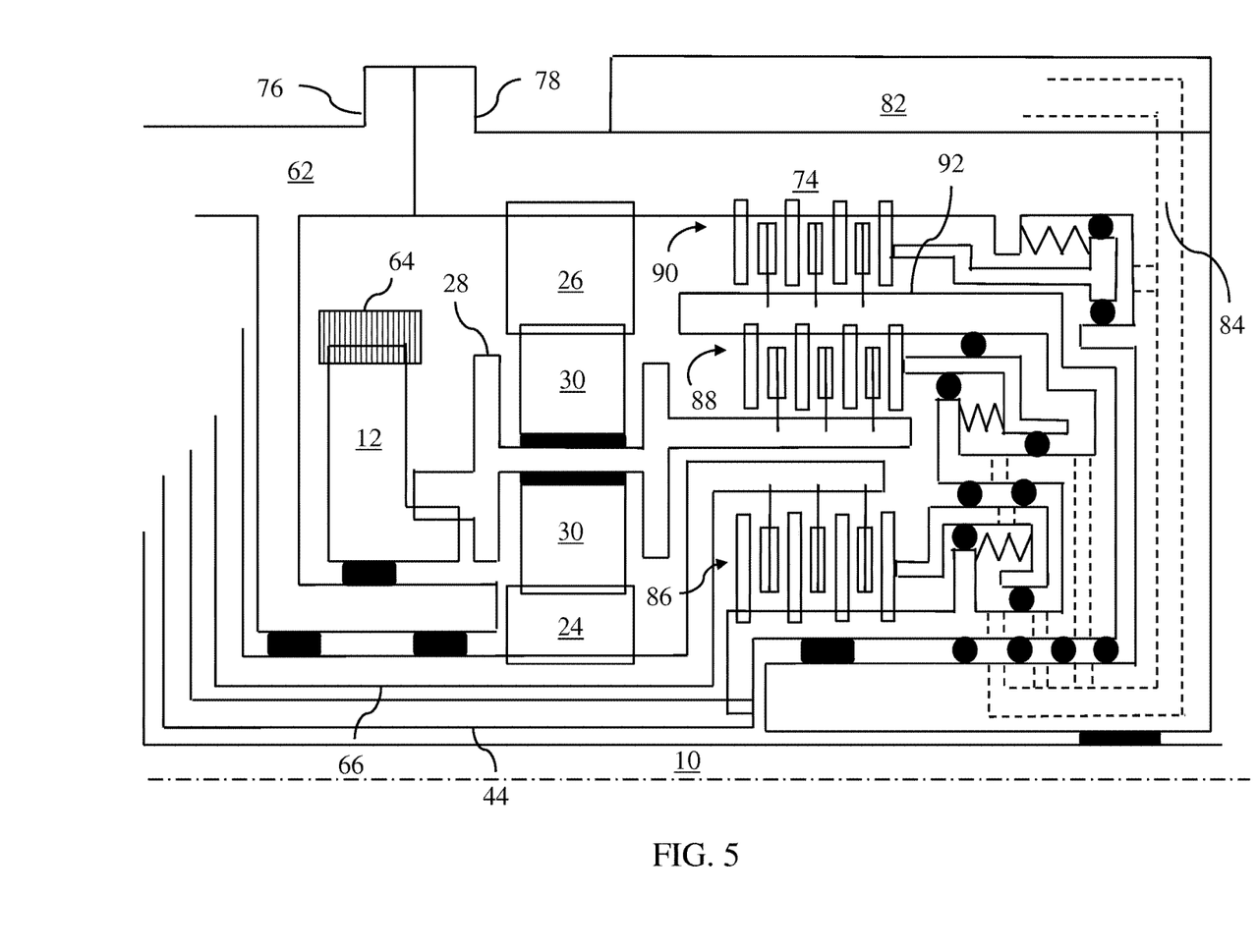
FIG. 5 is a cross sectional view of a front portion of the hybrid electric transmission arrangement of FIG. 4.

The rear portion of the transmission of FIG. 4 is identical to the rear portion of the transmission of FIG. 1 as shown in FIG. 2. FIG. 5 shows a cross section of a front portion of a transmission according to the arrangement illustrated schematically in FIG. 4. Parts that are common with the transmission of FIG. 3 are labeled with the same reference number. Intermediate shaft 44 is splined to clutch housing 92. Front housing 74 includes a series of fluid passageways 84 from valve body 82 to various shift elements One passageway carries fluid to an apply chamber of clutch 86. Another passageway carries fluid to an apply chamber of clutch 88. A third passageway carries unpressurized fluid to balance chambers of clutches 86 and 88. A fourth passageway carrier fluid to an apply chamber of brake 90 which is integrated into the front housing 74.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a first electric machine having a first rotor, and a first stator fixed to a center housing; and
   a first gearset having a first sun fixedly coupled to the first rotor, a first carrier fixedly coupled to an output, and a first ring fixed to a front housing, the output located between the first gearset and the center housing and the center housing located between the output and the first rotor.

2. The transmission of claim 1 wherein the output is supported for rotation about a primary axis and is configured to transfer power to a differential located on a differential axis offset from the primary axis.

3. The transmission of claim 2 further comprising:
   a rear housing fixed to the rear side of the center housing; and
   a second electric machine having a second stator and a second rotor supported by the rear housing for rotation about the primary axis.

4. The transmission of claim 3 wherein the second stator is fixed to the center housing.

5. The transmission of claim 3 further comprising a second gearset having a second sun fixedly coupled to the second rotor, a second carrier fixedly coupled to an input, and a second ring fixedly coupled to an intermediate shaft.

6. The transmission of claim 5 wherein the second gearset is located on a rear side of the first rotor, on a front side of the second rotor, and radially inside the first and second stators.

7. The transmission of claim 5 further comprising:
   at least one hydraulically actuated friction clutch located on the front side of the first gearset; and
   wherein the front housing is fixed to the front side of the center housing and supports the input for rotation, the front housing defining at least one passageway to convey pressurized fluid to the at least one hydraulically actuated friction clutch.

8. The transmission of claim 7 further comprising a third gearset having a third sun coupled to the front housing, a third carrier coupled to the input, and a third ring coupled to the output.

9. The transmission of claim 8 wherein:
   the third sun is fixed to the front housing;
   the third carrier is fixedly coupled to the input; and
   the at least one hydraulically actuated friction clutch is configured to selectively couple the third ring to the output.

10. The transmission of claim 7 wherein the at least one hydraulically actuated friction clutch comprises a first clutch configured to selectively couple the intermediate shaft to the output.

11. The transmission of claim 10 wherein the at least one hydraulically actuated friction clutch further comprises a second clutch configured to selectively couple the intermediate shaft to the first sun.

12. The transmission of claim 10 wherein the at least one hydraulically actuated friction clutch further comprises a brake configured to selectively hold the intermediate shaft against rotation.

13. A transmission comprising:
    a center housing supporting a first rotor;

a first planetary gearset having a first sun fixedly coupled to the first rotor, a first carrier fixedly coupled to an output, and a first ring fixedly held against rotation;

a rear housing supporting a second rotor;

a second planetary gearset having a second sun fixedly coupled to the second rotor, a second carrier fixedly coupled to an input, and a second ring fixedly coupled to the output;

a third planetary gearset having a third sun fixedly held against rotation, a third carrier fixedly coupled to the input, and a third ring; and a clutch configured to selectively couple the third ring to the output.

14. The transmission of claim 13 further comprising:

a front housing defining a passageway to conduct fluid from a valve body to the clutch to engage the clutch.

15. The transmission of claim 13 further comprising:

a first clutch configured to selectively couple the second ring to the output in response to pressurization of a fluid;

a second clutch configured to selectively couple the second ring to the first sun in response to pressurization of the fluid;

a brake configured to selectively hold the second ring against rotation in response to pressurization of the fluid; and a front housing defining three passageways to conduct the fluid from a valve body to the first clutch, the second clutch, and the brake.

16. A transmission comprising:

a center housing supporting a first rotor on a rear side and an output on a front side;

a first planetary gearset having a first sun fixedly coupled to the first rotor, a first carrier fixedly coupled to the output, and a first ring fixedly held against rotation;

a second planetary gearset having a second sun fixedly held against rotation, a second carrier fixedly coupled to an input, and a second ring;

a clutch configured to selectively couple the second ring to the output in response to pressurization of a fluid;

a front housing defining a passageway to conduct the fluid from a valve body to the clutch;

a rear housing supporting a second rotor; and a third planetary gearset having a third sun fixedly coupled to the second rotor, a third carrier fixedly coupled to the input, and a third ring fixedly coupled to the output.

* * * * *